United States Patent Office.

ALVAH H. SABIN, OF BURLINGTON, VERMONT, ASSIGNOR TO THE AMERICAN MILK-SUGAR COMPANY, OF SAME PLACE.

PROCESS OF MAKING LACTOSE OR MILK-SUGAR.

SPECIFICATION forming part of Letters Patent No. 329,858, dated November 3, 1885.

Application filed October 12, 1885. Serial No. 179,715. (No specimens.)

*To all whom it may concern:*

Be it known that I, ALVAH H. SABIN, of Burlington, in the State of Vermont, have invented certain new and useful Improvements in the Process of Making Lactose or Milk-Sugar, of which the following is a specification.

My present invention consists of certain improvements on the process of making milk-sugar set forth in my Letters Patent No. 307,594, of November 4, 1884. That process has for its object the obtaining of milk-sugar from whey, and consists, essentially, in preliminarily purifying the whey by heating and filtering it, then evaporating it nearly to dryness, and then cooling and washing the crystallized product obtained by the evaporating operation.

My improvements have reference to the purifying and the evaporating operations, my object being on the one hand to obtain more thorough purification of the whey, and on the other hand to shorten as well as render more effective the evaporating operation.

Ordinary whey as it comes from cheese-factories is frequently in bad condition, and much difficulty has been experienced in getting it properly purified, as it must be in order to produce milk-sugar. I have discovered that this difficulty may be overcome by treating the whey, during the purifying step of my patented process, with rennet, or extract of rennet, or a suitable acid. In practice I add to the whey, rennet or extract of rennet, and I then proceed to heat and filter the liquid, as set forth in my aforesaid Letters Patent. The proportions in which the rennet, or extract of rennet, is taken will of course vary somewhat with the quality of the whey; but it is best that the amount of rennet or rennet extract used with a given quantity of whey should not exceed one-fourth of that used with a corresponding quantity of new milk in the manufacture of cheese. In lieu of the rennet or rennet extract I can make use of an equivalent quantity (say not exceeding one hundredth of one per cent. of the weight of whey to be treated) of a suitable acid—such, for instance, as muriatic, acetic, or tannic acid; or I can use a mixture of the two.

The whey, after being subjected to the treatment whereby it is purified, is then (as set forth in my aforesaid Letters Patent) subjected to the evaporating operation—an operation usually effected by the use of an evaporating-pan heated by a water bath or a steam-jacket. My improvement here consists in subjecting the whey during this operation to the action of dried or heated air passed over or through the liquid. The air which is to be thus used is by suitable known means dried or heated, and in this condition is passed over or through the whey while the evaporating operation is in progress. Means whereby the air can be thus directed and caused to act are well known to those skilled in the art, and require no detailed explanation.

To pass the current of air over the surface of the whey, the evaporating-pan may be provided with a closed top or cover having inlet and outlet pipes or openings, the inlet communicating with the source of supply of artificially dried or heated air, which, of course, by a suitable blower or other instrumentality, is forced into the cover so as to pass over the surface of the liquid, and thence is discharged through the outlet. The cover, however, may be dispensed with, and the prepared air may be blown over the surface of the liquid. To pass the air through the whey, it should be injected into the body of the whey through pipes in the sides or bottom of the evaporating-pan, or otherwise arranged so as to discharge air into the whey. In this way I not only shorten the time required for the evaporating operation, but (which is of equal importance) I find that I obtain a product of higher grade and in greater quantity than can be obtained by the ordinary slow process of evaporation.

Although my improvements are designed more particularly to meet the needs of my aforesaid patented process, I do not wish to be understood as restricting myself to their use in that special connection, because it is manifest that they can be used in any other processes for making milk-sugar from whey which involve the steps of purification and evaporation, or either.

What I claim as new and of my own invention is—

1. The method of purifying whey, consisting in adding to the same rennet or its equivalent, in substantially the proportions stated, and heating and filtering the mixture, substantially as and for the purposes hereinbefore set forth.

2. In the manufacture of milk-sugar from whey, the method of hastening the evaporation of the whey by subjecting the same during the evaporating operation to the action of a current of dried or heated air passed over or through the liquid, substantially as and for the purposes hereinbefore set forth.

In testimony whereof I have hereunto set my hand this 10th day of October, 1885.

ALVAH H. SABIN.

Witnesses:
M. C. SEYMOUR,
ARTHUR R. H. PETERS.